Patented June 2, 1931

1,807,720

UNITED STATES PATENT OFFICE

AUGUST WINGLER, OF ELBERFELD, GERMANY, ASSIGNOR TO WINTHROP CHEMICAL COMPANY, INC., OF NEW YORK, N. Y., A CORPORATION OF NEW YORK

AROMATIC N-AMINO-ALKYL-AMINO ALDEHYDES

No Drawing. Application filed March 6, 1928, Serial No. 259,604, and in Germany April 16, 1927.

The present invention concerns new aromatic N-aminoalkyl-aminoaldehydes. They have probably a general formula

wherein A stands for hydrogen, which may be replaced by a monovalent substituent comprising the alkyl- and aminoalkyl, B represents aminoalkyl- group and Ar represents any aromatic residue which may be substituted, for instance by halogen, hydroxy, alkoxy or similar substituents.

In accordance with the present invention the said aromatic N-aminoalkylated aminoaldehydes are produced by subjecting such N-mono- and di-aminoalkylated aromatic amines, their derivatives and substitution products, as possess a free para-position and are prepared by decomposition of the aromatic amines with aminoalkylhalogenides, to the action of formaldehyde in the presence of an aromatic hydroxyl-amino compound or of the sulfonic acid thereof. The process can also be carried out by the treatment of aminoalkylated amines with formaldehyde and an aromatic nitro compound in the presence of a suitable reducing agent and decomposing the resulting arylidene compound formed in both cases; or aromatic aminoalkylated amines, containing substituents, such as for example, the methyl-methylol-, iso-allyl-group and the like, or which groups can be formed in the course of the reaction and can be transformed into an aldehyde group are converted in the customary manner into the aminoalkylated aminoaldehydes for example, by means of oxidizing agents.

The introduction of the aminoalkyl group into the primary or secondary amino group of the aromatic aldehyde can also take place subsequently by the customary methods of alkylation. This method enables, for example, the manufacture of mono- and di-aminoalkylated ortho- and meta-substituted aminoaldehydes, which are generally yellowish colored oils with strong basic properties, can be distilled in vacuo without decomposition, and are easily soluble in water in form of their inorganic salts.

The following examples will illustrate my invention. The particular proportions and the method of working can, of course, be varied within certain limits and the invention must not be read as being restricted by the examples, which describe the best method of working at present known to me.

*Example 1.*—N - diethylaminoethyl - para-aminobenzaldehyde

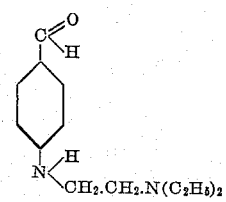

For the preparation of N-diethylaminoethyl-para-aminobenzaldehyde, 100 parts by weight of the sodium salt of 4-nitro-toluene-2-sulfonic acid are converted into the corresponding hydroxylamino-sulfonic acid by reduction with zinc dust in neutral solution; to the aqueous solution thus produced there is added, immediately after the reduction, concentrated hydrochloric acid until the solution reacts strongly acid to Congo paper and then 5.5 parts by weight of formaldehyde (40%) and 14 parts by weight of N-diethylaminoethyl-aniline dissolved in 15 parts by weights of concentrated hydrochloric acid are added to the solution in one lot. The reaction mixture becomes slightly warm with a pronounced darkening in colour and is allowed to stand for about two days at room temperature. Upon the addition of common salt, the condensation product of the aldehyde with the sulfonic acid of the formula:

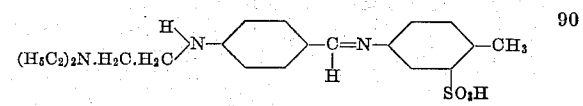

separates from the hydrochloric acid solution as the difficultly soluble hydrochloride in the form of orange yellow needles. These are filtered, washed with common salt solution, dissolved in 5 times the quantity of 10% caustic potash solution and converted into the free aldehyde by boiling up for a short time, the formation of the aldehyde taking place according to the following equation:

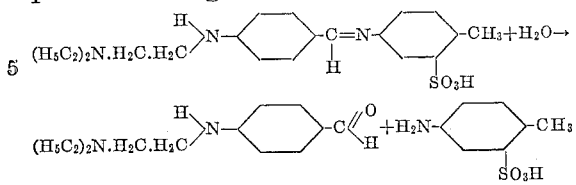

the aldehyde separating as an oil. By taking this up in ether or benzene, drying by means of potassium carbonate and distilling off the solvent the aldehyde is obtained as a yellow colored oil, which boils at a temperature of 157–159° C., under a pressure of 1 mm., without any considerable first runnings and without leaving an essential residue. The hydrochloride of the aldehyde is easily soluble in water.

Example 2.—N-methyl-diethylaminoethyl-para-aminobenzaldehyde

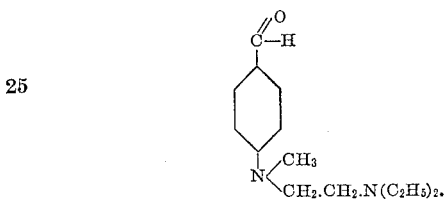

11 parts by weight of formaldehyde solution (40%) and a solution of 31 parts by weight of N-diethylaminoethyl-methylaniline in 30 parts by weight of concentrated hydrochloric acid are added to a solution of 4-hydroxylamino-toluene-2-sulfonic acid obtained by reduction of 200 parts by weight of the sodium salt of 4-nitrotoluene-2-sulfonic acid, as described in Example 1. The condensation product, formed in an analogous manner as indicated in Example 1 after standing for two days, is salted out and converted into the oily aldehyde, which boils at 166–168° C., under a pressure of 2 mm., and possesses similar properties to the compound described in Example 1.

The manufacture of the aldehyde can also be effected by causing the hydroxylamino-compound to act in the nascent state (by reduction of the corresponding nitro compound) upon the aromatic amine, instead of using the hydroxylamino compound per se:—for example, 200 parts by weight of the sodium salt of 4-nitrotoluene-2-sulfonic acid are dissolved in 1.2 parts by weight of hot water and the solution rendered acid to Congo paper by means of 40 parts by weight of concentrated hydrochloric acid. After the addition of 12 parts by weight of formaldehyde solution (40%), a solution of 31 parts by weight of N-diethylaminoethyl-methylaniline in 30 parts by weight of concentrated hydrochloric acid and 200 parts by weight of iron filings, the temperature is maintained at 30 to 35° C., for 3 to 4 hours, stirring the while. The resulting pronouncedly dark colored solution is then filtered and rendered acid to Congo paper with hydrochloric acid. After standing for 24 hours the condensation product formed is salted out and the aldehyde obtained therefrom as above described is identical with that described in the first part of this example.

A further method of preparing the aldehyde is the following:—

50 parts by weight of diethylaminoethyl-methylaniline are dissolved in 50 parts by weight of concentrated hydrochloric acid with the addition of 150 parts of water and 25 parts by weight of formaldehyde solution (30%) are added thereto. To this solution are added with vigorous stirring 250 parts by weight of a 10% potassium dichromate solution and the solution of 60 parts by weight of the sodium salt of 4-aminotoluene-2-sulfonic acid in 300 parts by weight of water. After standing for one day 65 parts by weight of concentrated hydrochloric acid are added thereto and the solution is then salted out with common salt. The condensation product of the aldehyde and the amino sulfonic acid which is precipitated is filtered off and decomposed with alkali. The aldehyde produced possesses a boiling point of 166 to 168° C., under a pressure of 2 mm., and otherwise the same properties as the compound described above.

Example 3.—N-methyl-N-gamma-(alpha-dimethylamino-gamma-methyl-propane)-para-amino-benzaldehyde.

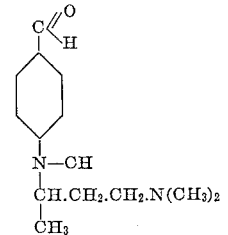

125 parts by weight of N-methyl-p-aminobenzaldehyde are boiled under reflux in 300 parts by weight of benzene with 140 parts by weight of α-dimethylamino-γ-chlorobutane for 10 to 12 hours. The reaction mixture is stirred with water and the aqueous solution is rendered alkaline with potassium carbonate after the separation of the benzene. The aminoalkylated aldehyde separates out as an oil, which is taken up with ether and dried with potassium carbonate. It distils without decomposition at 152 to 154° C., under a pressure of 1 mm.

Example 4.—N-diethylaminoethyl-ortho-chloro-para-aminobenzaldehyde.

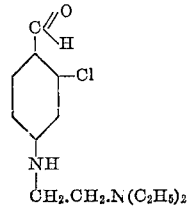

The aldehyde is obtained in the manner indicated in Example 1, from N-diethylaminoethyl-meta-chloro-aniline and has a boiling point of 120–125° C., under a pressure of 1.5 mm. It distils without decomposition as a faintly yellow colored oil at a temperature of 177–180° C., under a pressure of 1.5 mm.

*Example 5.* — N-diethylaminoethyl-meta-methoxy-para-aminobenzaldehyde.

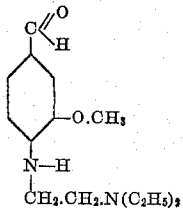

The aldehyde is obtained in the manner indicated in Example 1, from N-diethylaminoethyl-ortho-anisidine and has a boiling point of 144–146° C., under a pressure of 6 mm. It distils without decomposition as a faintly yellow colored oil at a temperature of 170–172° C., under a pressure of 1.5 mm.

*Example 6.* — N-diethylaminoethyl-ortho-aminobenzaldehyde.

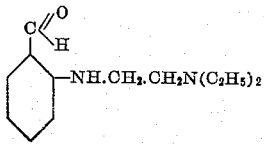

24 parts by weight of o-aminobenzaldehyde are heated to 100–110° C., in 50 parts by weight of nitrobenzene with 30 parts by weight of diethylaminoethyl-chloride, for a period of about 6 hours while stirring. The working up of the hydrochloride of the aminoalkylated aldehyde separating from the nitrobenzene is effected according to the directions of Example 3. The aldehyde distils as a faintly yellow colored oil at a temperature of 130–134° C., under a pressure of 2 mm.

I claim:—

1. As new products the compounds of the general formula

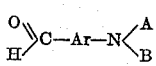

wherein A stands for hydrogen, alkyl or aminoalkyl, B stands for aminoalkyl and Ar stands for an aromatic residue which may be substituted, being generally yellowish colored oils with strong basic properties which can be distilled in vacuo without decomposition and being easily soluble in water in form of their inorganic salts.

2. As new products the compounds of the general formula

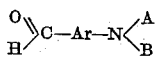

wherein A stands for hydrogen, alkyl or aminoalkyl, B stands for aminoalkyl and Ar stands for a benzene residue which may be substituted, being generally yellowish colored oils with strong basic properties which can be distilled in vacuo without decomposition and being easily soluble in water in form of their inorganic salts.

3. As new products the compounds having the general formula

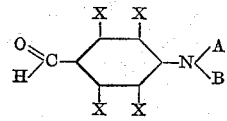

wherein A stands for hydrogen, alkyl or aminoalkyl, B stands for aminoalkyl and wherein X stands for a substituent of the group including hydrogen, halogen, hydroxyl and alkyl, being generally yellowish colored oils with strong basic properties which can be distilled in vacuo without decomposition and being easily soluble in water in form of their inorganic salts.

4. As a new product N-diethylaminoethyl-methyl-p-aminobenzaldehyde of the formula

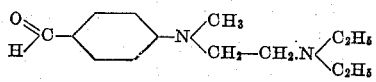

being a yellowish colored oil with strong basic properties boiling under a pressure of 2 mm., at 166–168° C., and being capable of being distilled undecomposed in vacuo, its hydrochloride being an orange colored fast powder which is easily soluble in water.

In testimony whereof I have hereunto set my hand.

AUGUST WINGLER.